United States Patent
Miyamoto et al.

(10) Patent No.: US 7,423,866 B2
(45) Date of Patent: Sep. 9, 2008

(54) DISPLAY UNIT AND PORTABLE ELECTRONIC DEVICE

(75) Inventors: Tomofumi Miyamoto, Nishitama-gun (JP); Kohei Wada, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 11/376,872

(22) Filed: Mar. 16, 2006

(65) Prior Publication Data

US 2006/0232920 A1 Oct. 19, 2006

(30) Foreign Application Priority Data

Apr. 14, 2005 (JP) ............................. 2005-117301

(51) Int. Cl.
*G06F 1/16* (2006.01)
(52) U.S. Cl. ...................... 361/681; 430/313; 313/238
(58) Field of Classification Search .................. 349/58; 430/313; 313/238, 582; 361/679–687, 724–727
See application file for complete search history.

(56) References Cited

U.S. PATENT DOCUMENTS

2003/0137801 A1 7/2003 Shimada et al.
2007/0218411 A1* 9/2007 Sakata ..................... 430/313
2007/0228917 A1* 10/2007 Koiwa ..................... 313/238
2007/0229727 A1* 10/2007 Yamazaki .................. 349/58

FOREIGN PATENT DOCUMENTS

| JP | 08-054961 | 2/1996 |
| JP | 2003-015530 | 1/2003 |
| JP | 2004-325844 | 11/2004 |

* cited by examiner

*Primary Examiner*—Hung V Duong
(74) *Attorney, Agent, or Firm*—Blakely, Sokoloff, Taylor & Zafman LLP

(57) ABSTRACT

According to one embodiment, a notebook PC includes a display unit, and a PC proper coupled to the display unit by hinges so that the PC can be opened and closed. The display unit includes a display panel, a case covering the back surface of the panel, and a reinforcing plate attached to and covers part of the outer surface of the case. The reinforcing plate enables the case of the display panel to be thinned and to have a sufficient rigidity.

20 Claims, 7 Drawing Sheets

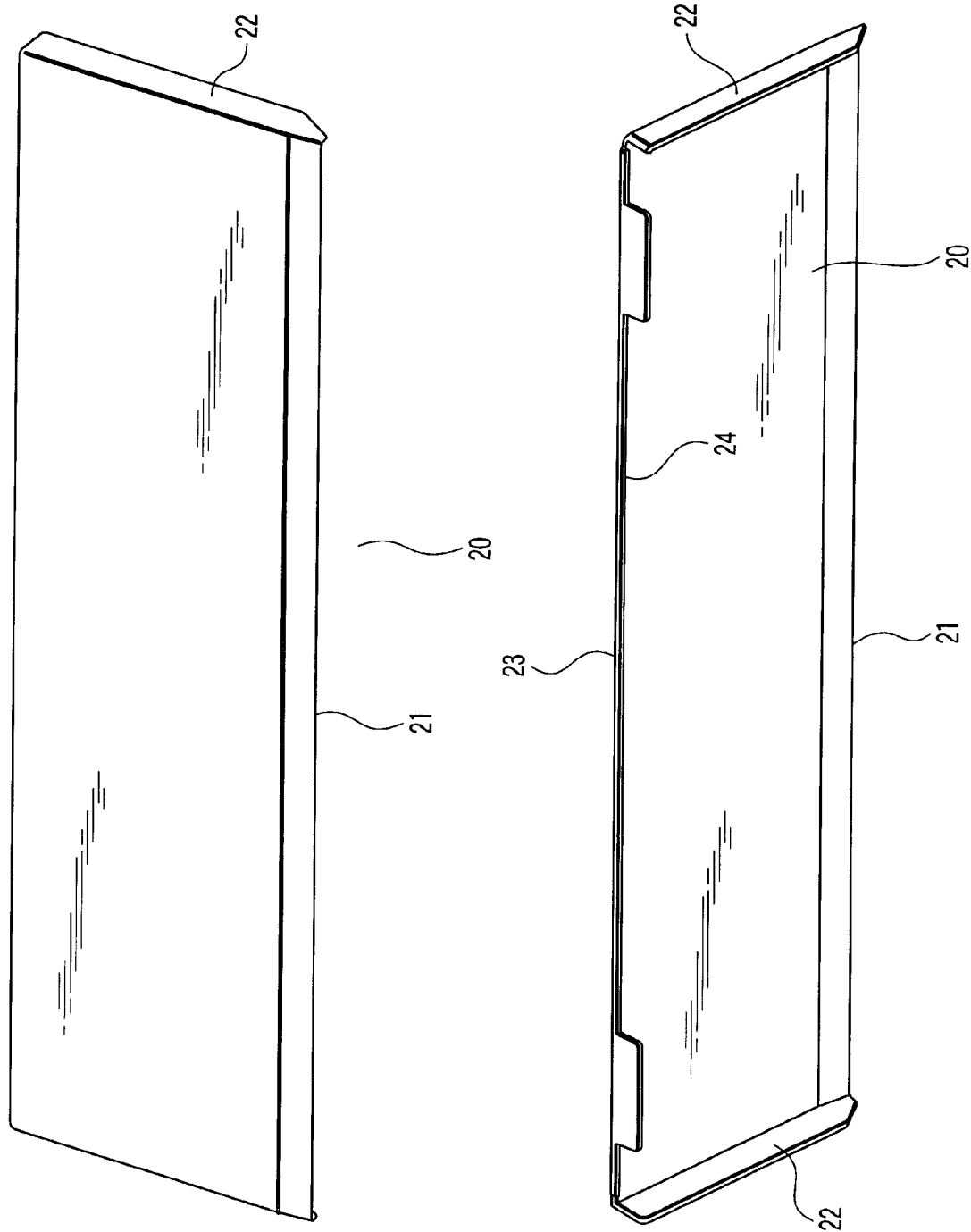

DISPLAY UNIT AND PORTABLE ELECTRONIC DEVICE

CROSS-REFERENCE TO RELATED APPLICATIONS

This application is based upon and claims the benefit of priority from Japanese Patent Application No. 2005-117301, filed Apr. 14, 2005, the entire contents of which are incorporated herein by reference.

BACKGROUND

1. Field

One embodiment of the invention relates to a portable electronic device, such as a notebook personal computer, and its display unit.

2. Description of the Related Art

Notebook personal computers (hereinafter referred to as "notebook PCs") with operable/closable display panel cases attached to their main units are well known. The notebook PCs are designed to be carried, therefore the cases, in particular, of their display panels are required to have a high rigidity.

I is disclosed by, for example, it is known from, for example, Jpn. Pat. Appln. KOKAI Publication No. 2003-15530 (see section [0059]; FIG. 5) to use, as a reinforcing structure for the case, a structure in which a rectangular transparent acrylic plate serving as a reinforcing member is attached to the back of the case. The reinforcing member has a size that substantially covers the entire back surface of the case, and its frame is adhered to the back surface.

The attachment of the reinforcing member to the entire back surface of the case (i.e., the entire front surface of the PC) increases the strength, without more increasing the thickness of the case than required. Further, when the back surface of the case is damaged, the case may well be restored simply by replacing the reinforcing member.

However, if the reinforcing member has substantially the same size as the case as described above, the strength of the peripheral portion of the case can be enhanced, whereas the strength of the central portion cannot sufficiently be enhanced. It is possible to provide, for instance, ribs for increasing the strength of the central portion. In this case, the case is inevitably thickened, thereby thickening the entire notebook PC.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

Referring to the accompanying drawings, the embodiment of the invention will be described in detail.

FIG. 5 is an exemplary perspective view of the reinforcing plate;

FIG. 6 is an exemplary perspective view of the reverse surface of the reinforcing plate of FIG. 5;

DETAILED DESCRIPTION

Various embodiments according to the invention will be described hereinafter with reference to the accompanying drawings. In general, according to one embodiment of the invention, the display unit of a notebook PC comprises a display panel, a case for the display panel, and a reinforcing plate that covers part of the case. The reinforcing plate covering part of the case can provide a higher strength to the case than a reinforcing plate covering the entire case.

Figure 1:
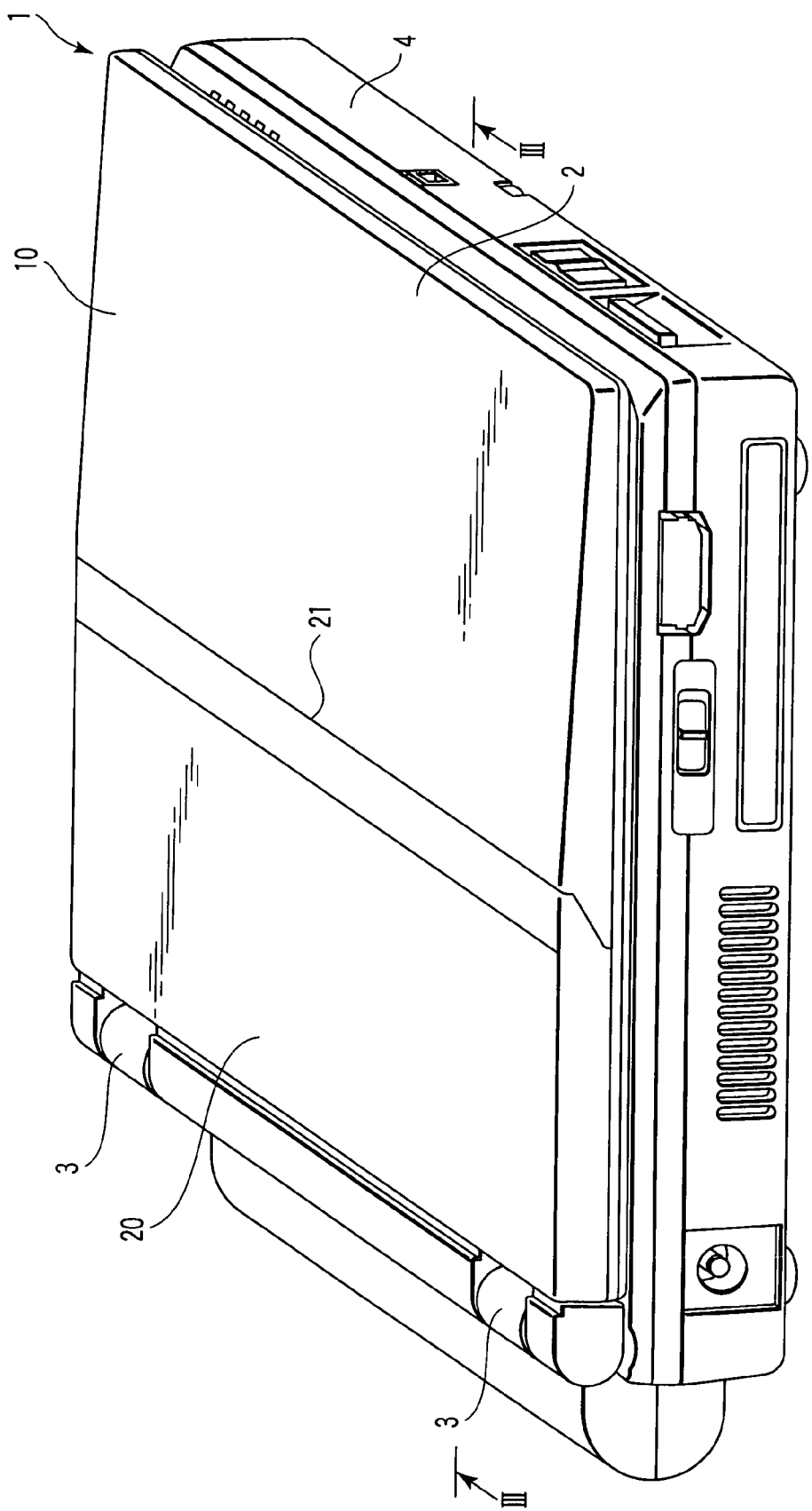
FIG. 1 is an exemplary perspective view illustrating the outward appearance of a notebook PC according to an embodiment of the invention.

FIG. 1 is a schematic perspective view illustrating a notebook personal computer (hereinafter referred to as a "notebook PC") 1 as a portable electronic device according to the embodiment. Further, FIG. 2 is a schematic perspective view of an open state of the notebook PC, illustrating a display unit 2 and PC proper (main unit) 4 incorporated in the notebook PC.

Figure 2:
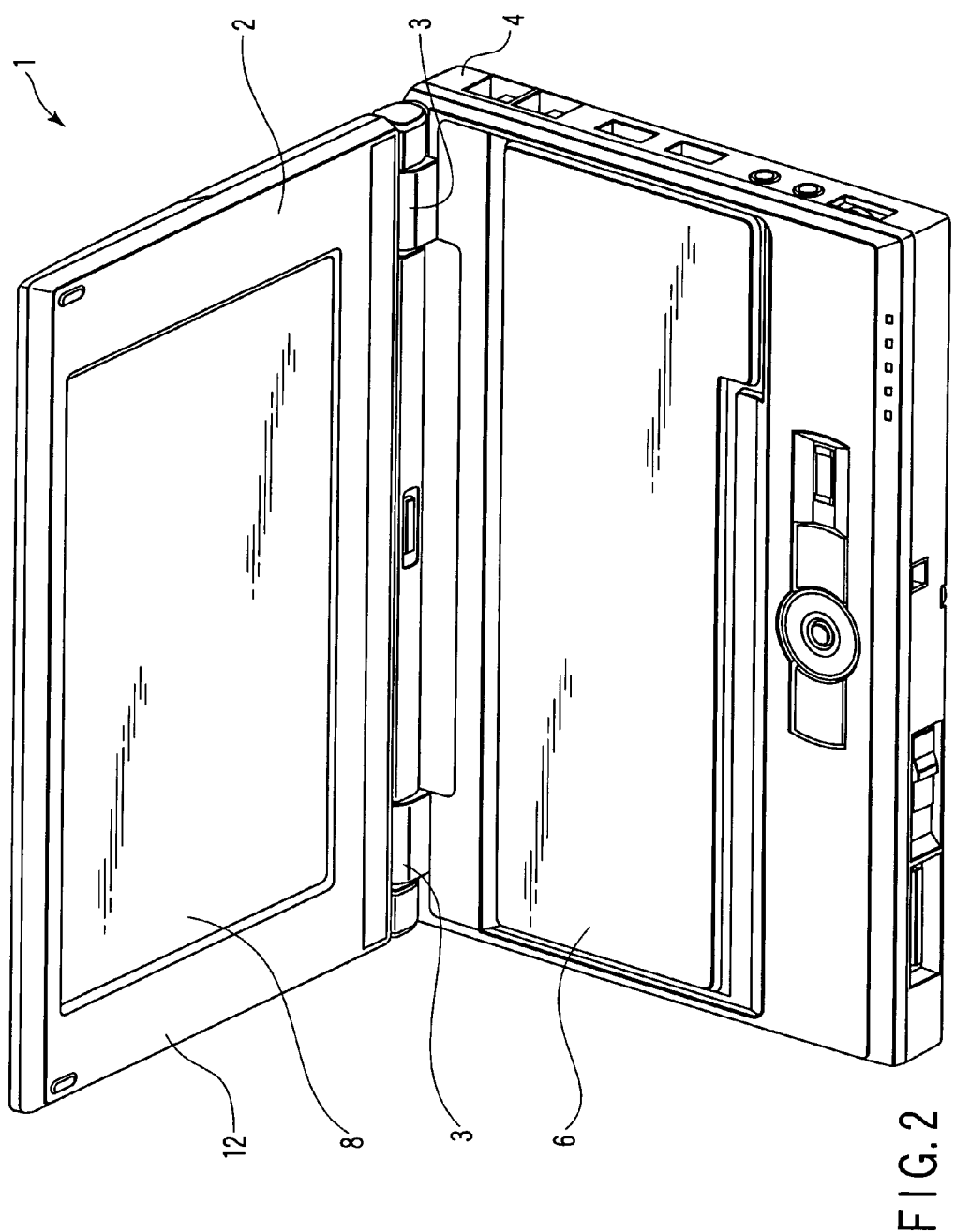
FIG. 2 is an exemplary perspective view of an open state of the notebook PC of FIG. 1, illustrating the display unit and main unit of the PC.

As shown in FIG. 2, the notebook PC 1 is formed by attaching, to the rear side of the PC proper 4, the display unit 2 in an openable/closable manner using two hinges. The upper surface (front surface) of the PC proper 4 is provided with, for example, a keyboard 6 functioning as an input unit through which an operator inputs data. As shown in FIG. 1, the display unit 2 covers the keyboard 6 when it is closed. The display unit 2 has a display panel 8 that opposes the keyboard 6 when the display unit is closed.

The display unit 2 has a case 10 of a resin attached to and covering the back surface of the display panel 8. A reinforcing plate 20 formed of a processed aluminum plate is attached to part of the outer surface of the case 10, covering the part. In the embodiment, the reinforcing plate 20 is formed rectangular, and attached to the portion of the display unit 2 that is located closer to the hinges 3 in the width direction (second direction) of the unit 2. The reinforcing plate 20 has an edge 21 extending along substantially the entire length in the length direction (first direction). In the embodiment, since the reinforcing plate 20 extends along the entire length and covers substantially half the width of the case 10, the edge 21 extends along substantially the center of the case 10.

The reinforcing plate 20 that covers half the outer surface of the case 10 in the width direction of the display unit 2 exhibits high rigidity in the width direction, with the result that the rigidity of the case 10 itself is enhanced. As described above, if a reinforcing plate of substantially the same size as the case 10 is attached to the entire case 10, the center of the case 10 cannot exhibit sufficient rigidity. In contrast, if the length of the reinforcing plate is shortened in one direction as in the embodiment, the rigidity in at least one direction can be enhanced. Furthermore, since the edge 21 of the reinforcing plate 20 extends along substantially the center of the case 10, if it is adhered to the case 10, the center of the case 10 can also exhibit high rigidity.

Figure 3:
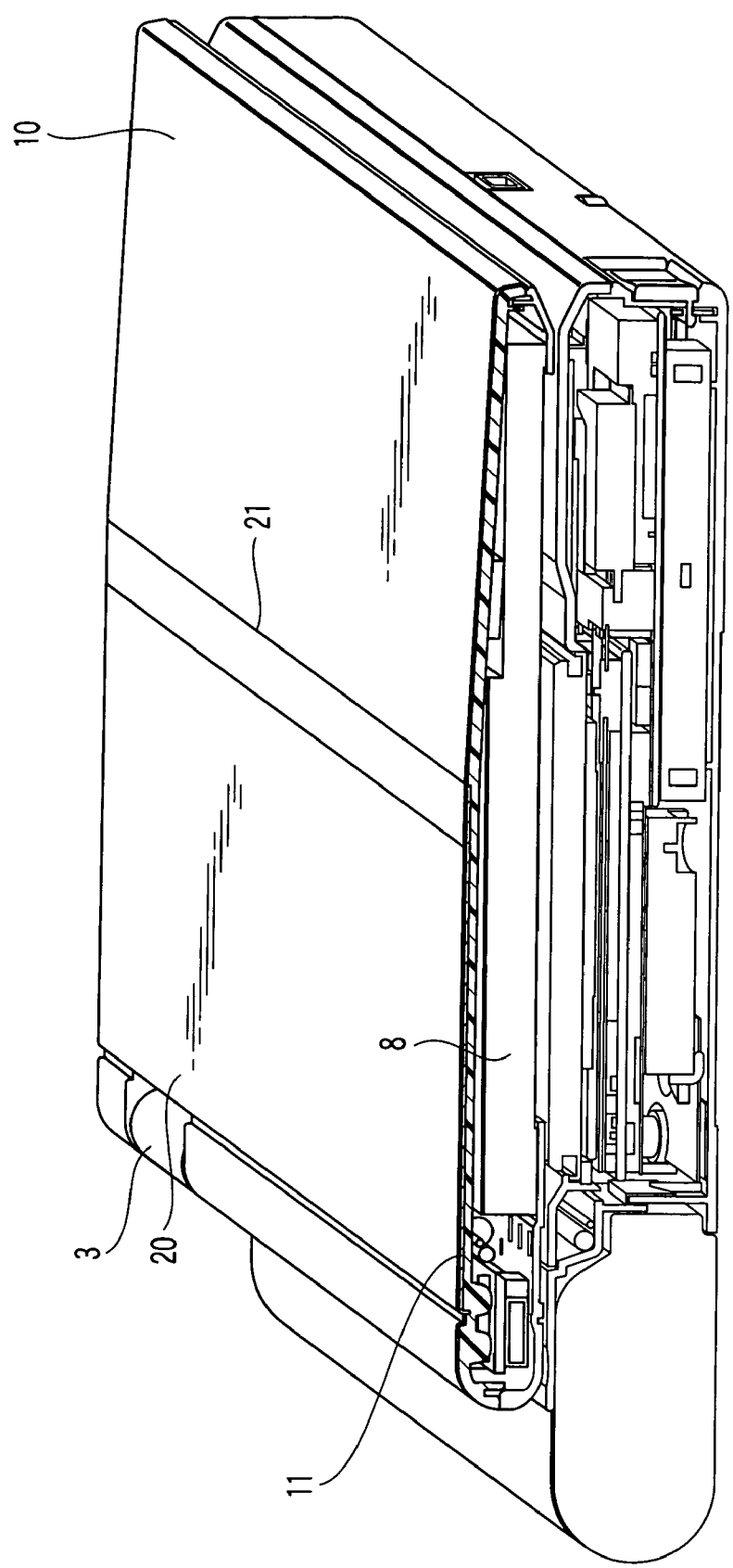
FIG. 3 is an exemplary sectional view illustrating the notebook PC of FIG. 1.
Figure 4:
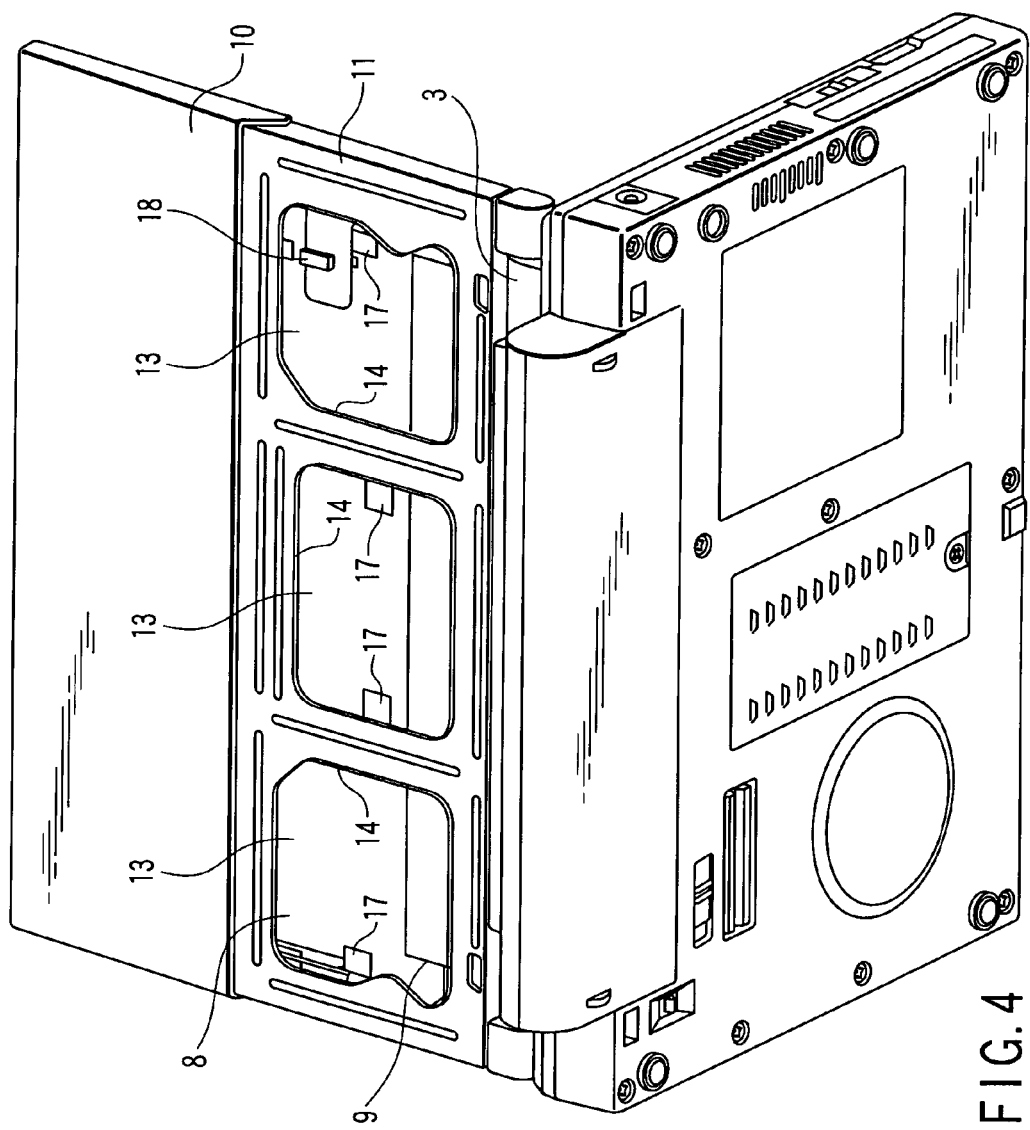
FIG. 4 is an exemplary perspective view illustrating a state in which a reinforcing plate is detached from the case of the display unit of the notebook PC.
Figure 7:
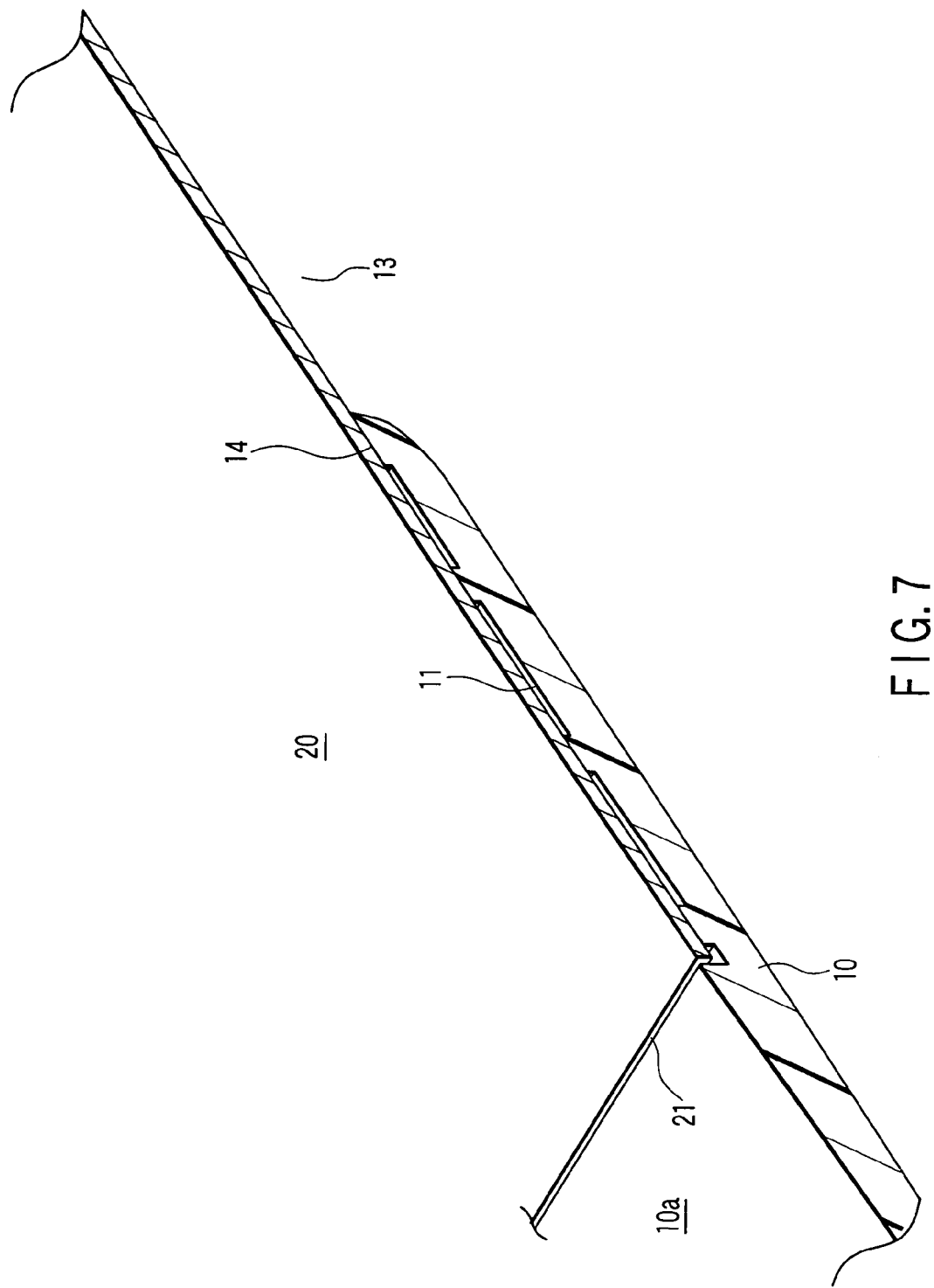
FIG. 7 is an enlarged fragmentary sectional view illustrating the connection portion between the recess of the case and the reinforcing plate.
Figure 8:
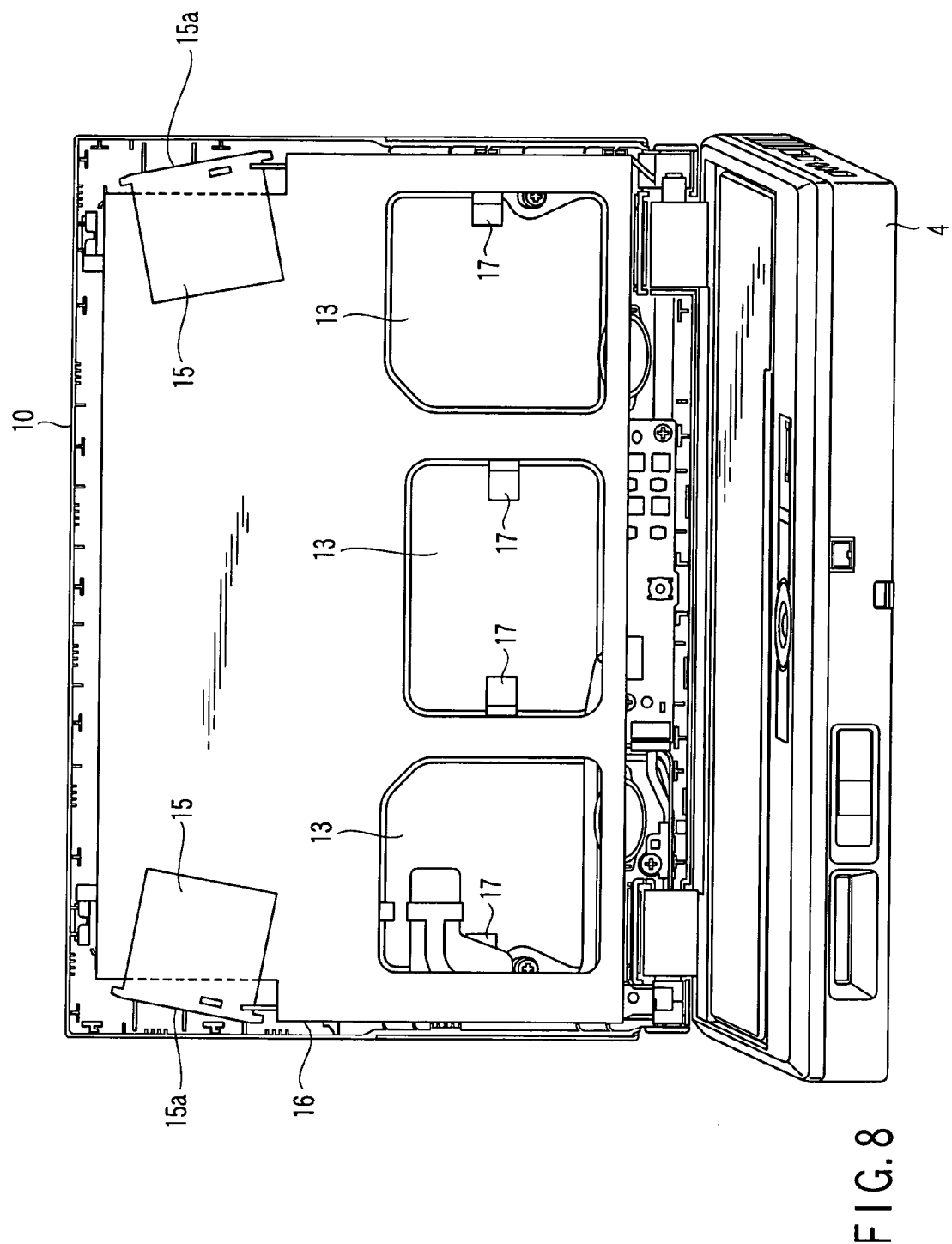
FIG. 8 is an exemplary perspective view illustrating a state in which a display panel is detached from the case of the display unit.

Referring now to FIGS. 3 to 8, the structure of the display unit 2 will be described in more detail. FIG. 3 is a sectional view taken along line III-III of FIG. 1. FIG. 4 is a perspective view when viewed from the rear side of the notebook PC, illustrating a state in which the reinforcing plate 20 is detached from a recess 11 defined in the case 10. FIG. 5 is a perspective view of the reinforcing plate 20 detached from the recess 11 of the case 10. FIG. 6 is a perspective view illustrating the reverse surface of the reinforcing plate 20. FIG. 7 is an enlarged fragmentary sectional view illustrating the connection portion between the recess 11 of the case 10 and the reinforcing plate 20. FIG. 8 is a perspective view illustrating the inner surface of the case 10 as viewed when the display panel 8 is detached from the case 10.

As described above, the display unit 2 is an assembly of the display panel 8, case 10, reinforcing plate 20, and the like. More specifically, in the display unit 2, the display panel 8 is received inside the case 10 shown in FIG. 8, and the rectangular frame 2 shown in FIG. 2 is attached to the front peripheral portion of the display panel 8. Further, the reinforcing plate 20 shown in FIG. 5 is fitted in the recess 11 defined in the back surface of the case 10.

In the embodiment, the display panel 8 is a liquid crystal display (LCD) panel, and contains a fluorescent light (not shown) serving as a backlight. Further, as shown in FIG. 4, a wiring board 9 for connecting a driving circuit (not shown) is attached to the reverse surface of the display panel 8. The wiring board 9 extends near the hinges 3 in the length direction of the display unit 2, and is in pressure contact with a connection terminal (not shown) provided on the display panel 8.

The case 10 covers the back surface of the display panel 8. The recess 11 for receiving the reinforcing plate 20 is formed in the outer surface of the case 10. The recess 11 for receiving the reinforcing plate 20 has three openings 13 as shown in FIG. 4. An annular wall portion 14 is formed along the entire edge of each opening 13, protruding to the reinforcing plate 20. The annular wall portions 14 prevent adhesive from flowing into the openings 13 when the reinforcing plate 20 is fitted in the recess 11 by introducing the adhesive into the recess.

Two antennas 15 used for performing wireless communication with an external device (not shown) are attached to the inner surface of the case 10 opposing the display panel 8, as shown in FIG. 8. A shield member 16 is attached to substantially the entire inner surface of the case 10, except for the openings 13 and the functioning parts 15a of the antennas 15. In the embodiment, the shield member 16 is formed by depositing aluminum on the inner surface of the case 10.

Namely, the antennas 15 are located so that they do not overlap with the reinforcing plate 20 made of a metal, and the functional parts 15a are not covered with the shield member 16. As a result, the communication performance of the antennas 15 is prevented from being degraded by the reinforcing plate 20 and shield member 16.

As aforementioned, the reinforcing plate 20 is fitted in the recess 11 formed in the outer surface of the case 10. The reinforcing plate 20 has longitudinal opposite ends 22 angled in the same direction in accordance with the configuration of the recess 11 of the case 10, and has a long side 23 located away from the edge 21. The long side 23 is slightly angled, thereby providing a rib 24 extending in the length direction of the reinforcing plate 20. As a result, the longitudinal rigidity of the reinforcing plate 20 is also enhanced.

When the reinforcing plate 20 is fitted in the recess 11 of the case 10 as shown in FIG. 3, the edge 21 slightly retracts in the recess 11, i.e., is at a level slightly lower than the outer surface 10a of the case 10, as shown in the enlarged view of FIG. 7. If the edge 21 of the metal reinforcing plate 20 is at a level higher than the outer surface 10a of the resin case 10, it may hurt the hand of the user when they carry the notebook PC. To avoid this, in the embodiment, the edge 21 of the reinforcing plate 20 is buried in the recess 11 of the case 10 so as not to be at a higher level than the outer surface 10a of the case 10.

After fitting in the recess 11 of the case 10, the reinforcing plate 20 is electrically connected to the shield member 16 through the openings 13 by the conductive tapes 17 shown in FIGS. 4 and 8. As a result, the portions of the reinforcing plate 20 that are located corresponding to the openings 13, in which the shield member 16 is not provided, can function as shield members. This effectively prevents the electromagnetic radiation generated by the notebook PC from being emitted by the PC.

An electronic component 18 projects from the back surface of the display panel 8 that opposes the reinforcing plate 20 through the openings 13 of the case 10. If no opening 13 is formed at the position corresponding to the electronic component 18, and if an external force is applied to the case 10, concentration of stress will occur at the position of the electronic component 18, whereby the display panel 8 may be damaged. The opening 13 formed in the case 10 at the position corresponding to the electronic component 18 imparts, to the reinforcing plate 20, a margin of deformation corresponding to the thickness of the case 10, thereby preventing such concentration of stress as the above.

As described above, in the embodiment, the reinforcing plate 20 having a size substantially half the width of the case 10 is fitted in the recess 11. This enhances the lateral rigidity of the reinforcing plate, and reduces the weight of the entire device, compared to the case where the reinforcing plate covers the entire case 10. Further, since the reinforcing plate 20 covers half the outer surface 10a of the case 10, the antennas 15 can be located where no reinforcing plate is provided, therefore degradation of the communication performance of the PC is avoided.

Further, in the embodiment, the reinforcing plate 20 can be located at the position corresponding to the wiring board 9 on the display panel 8, i.e., at the position at which it covers the portion that will easily be damaged by external force. As a result, a notebook PC suitable for being carried can be provided.

Also, in the embodiment, the three openings 13 are formed in the portion of the case 10 on which the reinforcing plate 20 is provided, i.e., in the recess 11 of the case 10. Accordingly, the case 10 can be made light, and the cost of the material of the case 10 can be reduced. One of the openings 13 is formed in the case 10 at the position corresponding to the electronic component 18 that projects from the back surface of the display panel 8. This imparts, to the reinforcing plate 20, a margin of deformation corresponding to the thickness of the case 10. Therefore, even if an external force is applied to the reinforcing plate 20 fitted in the recess 11, it is almost impossible for the reinforcing plate 20 to be brought into contact with the electronic component 18.

In addition, since the openings 13 are formed in the portion of the case 10 on which the reinforcing plate 20 is provided, the shield member 16 formed by deposition on the inner surface of the case 10 can be electrically connected to the metal reinforcing plate 20 through the openings 13. This means that the shield member 16, which is reduced in area and hence shielding effect by the openings 13, can be compensated for by the reinforcing plate 20. As a result, the electromagnetic radiation generated by the PC are effectively blocked.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For instance, although in the above-described embodiment, a single reinforcing plate 20 extends on the case 10 in the length direction thereof and covers substantially half the outer surface of the case 10, the invention is not limited to this, but two or more reinforcing plates may be provided. Alternatively, a laterally-extending reinforcing plate or L-shaped reinforcing plate may be provided. In any case, it is sufficient if the length of the reinforcing plate in one direction is reduced to thereby increase the rigidity of the member in the same direction.

Further, although in the above-described embodiment, the case 10 of the display panel 2 is formed of a resin, and the reinforcing plate 20 is formed of aluminum, the invention is not limited to this, but the reinforcing plate 20 may be formed of a magnesium alloy. Alternatively, the case 10 may be formed of a magnesium alloy, and the reinforcing plate 20 may be formed of aluminum. In any case, it is sufficient if the reinforcing plate 20 is formed of a material that differs from the material of the case 10 and has a higher rigidity than it. Thus, if the reinforcing plate 20 is formed of a material that differs from the material of the case 10 and has a higher rigidity than it, the rigidity of the case 10 can be enhanced compared to the case where the reinforcing plate 20 and case 10 are formed of the same material.

Moreover, although in the above-described embodiment, the reinforcing plate 20 is provided on the display panel 8 at the position corresponding to the wiring board 9, the location of the reinforcing plate 20 is not limited to this. However, it is desirable that the reinforcing plate 20 be provided at the position at which it covers the portion that will easily be damaged by external force. For example, the reinforcing plate 20 may be provided at the position at which it covers a fluorescent light as a backlight for the display panel 8.

What is claimed is:

1. A display unit comprising:
  a display panel;
  a case covering a back surface of the display panel; and
  a reinforcing plate formed of a material differing from a material of the case, and attached to an outer surface of the case, the reinforcing plate extending along an entire length of the case in a first direction, and along part of a length of the case in a second direction perpendicular to the first direction.

2. The display unit according to claim 1, wherein the reinforcing plate has a size substantially half the length of the case in the second direction.

3. The display unit according to claim 2, wherein the reinforcing plate has an edge extending in the first direction at a position corresponding to substantially a center of the case in the second direction.

4. The display unit according to claim 3, wherein:
  the case is formed of a resin and has a recess in which the reinforcing plate is fitted; and
  the reinforcing plate is formed of an alloy at least containing a light metal, the edge of the reinforcing plate, which extends in the first direction, retracting in the recess to a level lower than the outer surface of the case when the reinforcing plate is fitted in the recess.

5. The display unit according to claim 1, wherein the reinforcing plate is provided at a position at which the reinforcing plate covers a portion of the display panel which is connected to a driving circuit.

6. The display unit according to claim 1, wherein the reinforcing plate is provided at a position at which the reinforcing plate covers a light for the display panel.

7. The display unit according to claim 1, wherein the case is formed of a resin, and the reinforcing plate is formed of an alloy at least containing a light metal.

8. The display unit according to claim 7, further comprising an antenna which performs wireless communication with an external device, the antenna being located at a position at which the reinforcing plate is not provided.

9. The display unit according to claim 8, further comprising a shield member which blocks electromagnetic radiation, the shield member being provided on an inner surface of the case which opposes the display panel and does not correspond to the antenna.

10. The display unit according to claim 1, wherein the case includes at least one opening formed in a portion of the case covered by the reinforcing plate.

11. The display unit according to claim 10, wherein an electronic component projects from a portion of the display panel which opposes the reinforcing plate through the opening.

12. The display unit according to claim 10, wherein:
  the reinforcing plate is formed of a metal;
  a shield member for blocking electromagnetic radiation is provided on an inner surface of the case which opposes the display panel and excludes the at least opening; and
  the shield member is electrically connected to the reinforcing plate through the opening of the case.

13. The display unit according to claim 10, wherein an entire edge of the opening provides an annular wall portion projecting to the reinforcing plate.

14. A display unit comprising:
  a display panel;
  a case covering a back surface of the display panel;
  a reinforcing plate formed of a material at least containing a light metal, the reinforcing plate being attached to an outer surface of the case, the reinforcing plate extending along an entire length of the case and covering part of the case; and
  an antenna used to perform wireless communication with an external device and provided at a position at which the reinforcing plate is not provided.

15. The display unit according to claim 14, further comprising a shield member which blocks electromagnetic radiation, the shield member being provided on an inner surface of the case which opposes the display panel and does not correspond to the antenna.

16. The display unit according to claim 15, wherein:
  the case includes at least one opening formed in a portion of the case covered by the reinforcing plate; and
  the shield member is electrically connected to the reinforcing plate through the opening of the case.

17. A portable electronic device comprising:
  a main unit including an input unit at a front surface thereof; and
  a display unit which opens and closes the front surface of the main unit,
  wherein the display unit including:
  a display panel;
  a case covering a back surface of the display panel; and
  a reinforcing plate formed of a material differing from a material of the case, and attached to an outer surface of the case, the reinforcing plate extending along an entire length of the case in a first direction, and along part of a length of the case in a second direction perpendicular to the first direction.

18. The portable electronic device according to claim 17, wherein the reinforcing plate has a size substantially half the length of the case in the second direction.

19. The portable electronic device according to claim 18, wherein the reinforcing plate has an edge extending in the first direction at a position corresponding to substantially a center of the case in the second direction.

20. The portable electronic device according to claim 17, wherein the case is formed of a resin, and the reinforcing plate is formed of an alloy at least containing a light metal.

* * * * *